United States Patent Office 3,417,945
Patented Dec. 24, 1968

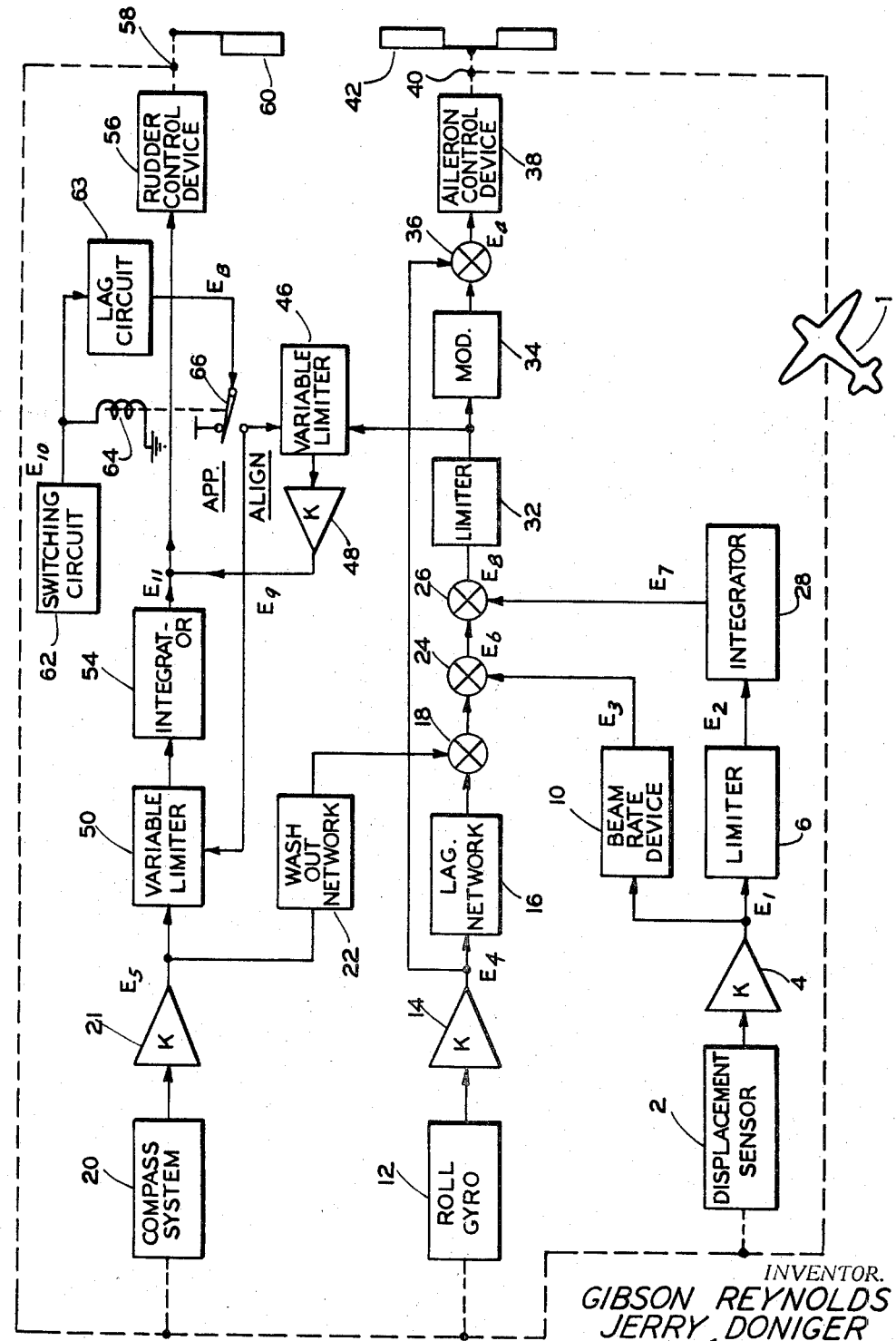

3,417,945
AIRCRAFT CONTROL SYSTEM FOR LATERAL RUNWAY ALIGNMENT
Gibson Reynolds, Tuxedo Park, N.Y., and Jerry Doniger, Montvale, N.J., assignors to The Bendix Corporation, a corporation of Delaware
Filed Nov. 30, 1965, Ser. No. 510,483
8 Claims. (Cl. 244—77)

ABSTRACT OF THE DISCLOSURE

A system for controlling an aircraft during runway approach and runway alignment maneuvers while landing the aircraft including controlling the aircraft rudder during the approach maneuver in response to lateral displacement integral, lateral displacement differential, heading displacement and roll angle signals; controlling the rudder during the alignment maneuver in response to heading displacement integral signals; and controlling the aircraft ailerons during the approach and alignment maneuvers in response to lateral displacement integral, lateral displacement differential, heading displacement, and roll angle signals.

---

This invention relates to flight control systems and, more particularly, to a system for landing an aircraft with the longitudinal axis of the aircraft aligned with the center line of a runway.

When an aircraft lands automatically with a prevailing crosswind, the aircraft heads angularly into the wind to fly in the direction of the center line of the runway. The longitudinal axis of the aircraft is thus at an angle to the center line of the runway and the aircraft is displaced from the center line of the runway. The main wheel axis of the aircraft has a drift velocity which generates side loads on the landing gear at touch down, thereby subjecting the landing gear to undue strain.

One object of this invention is to provide means for aligning the longitudinal axis of the aircraft with the center line of the runway, with a prevailing crosswind, during a landing maneuver.

Another object of this invention is to minimize loads on the wheel axis of the aircraft caused by prevailing crosswinds during a landing maneuver.

Another object of this invention is to align the longitudinal axis of the aircraft with the center line of the runway prior to touchdown by providing signals as a function of the lateral displacement of the aircraft from the center line of the runway, signals as a function of the heading displacement of the aircraft from the center line of the runway and signals as a function of the roll angle of the aircraft, and controlling the aircraft rudder and ailerons in response to the signals so as to align the longitudinal axis of the aircraft with the center line of the runway.

The present invention contemplates a system for controlling an aircraft while landing the aircraft, comprising: means for providing first signals corresponding to the lateral displacement of the aircraft from the center line of the runway; means for integrating the first signals to provide second signals as an integral function of the lateral displacement; means for providing third signals corresponding to the rate of change of the lateral displacement; means for providing fourth signals corresponding to the heading displacement of the aircraft relative to the center line of the runway; means for integrating the fourth signals to provide fifth signals as an integral function of the heading displacement; means for providing sixth signals corresponding to the roll angle of the aircraft; rudder control means responsive to the second, third, fourth and sixth signals to control the aircraft rudder a runway approach maneuver, and responsive to the fifth signals for controlling the aircraft rudder during a runway alignment maneuver, and aileron control means responsive to the second, third, fourth and sixth signals for controlling the aircraft ailerons during the approach and alignment maneuvers.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

In reference to the drawing, the single figure represents a block diagram of a flight control system for automatically landing an aircraft including novel means for aligning the longitudinal axis of the aircraft with the center line of the runway prior to touchdown.

Runway approach maneuver

During the runway approach maneuver a displacement sensor 2, mounted on an aircraft 1, provides a signal corresponding to the lateral displacement of aircraft 1 from the center line of the runway. For purposes of illustration, displacement sensor 2 is shown herein to be a localizer receiver providing a signal corresponding to the displacement of aircraft 1 from a preset radio beam center line reference. This signal is applied to an amplifier 4 providing a beam displacement signal $E_1$, which is applied to a limiter 6 providing a limited beam displacement signal $E_2$.

Signal $E_1$ from amplifier 4 is applied to a beam rate device 10, including a low pass filter and a differentiating circuit, which differentiates the applied signal to provide a beam rate signal $E_3$ proportional to the rate of change of beam displacement signal $E_1$.

In order to render the control system less sensitive to radio beam noise, and thereby minimize control activity, beam rate signal $E_3$ is augmented on a short term basis to compensate for the high frequency portion thereof rejected by the low pass filter in rate device 10. This augmentation is provided by using a roll gyro 12 mounted on aircraft 1 to provide a signal corresponding to the roll attitude of the aircraft. The roll attitude signal is applied to an amplifier 14 providing an amplified signal $E_4$ which is applied to a lag network 16. The amplified lagging signal is applied to a summation point 18.

A compass system 20, mounted on aircraft 1, provides a signal corresponding to the heading displacement of the aircraft relative to the center line of the runway. This signal is applied to an amplifier 21 providing a heading displacement signal $E_5$ which is applied to a washout network 22. The output of washout network 22 is aplied to summation point 18.

Lag filter 16 and washout network 22 pass only the high frequency portions of roll attitude signal $E_4$ and heading displacement signal $E_5$, respectively, to provide a signal at summation point 18 which is a short term, simulated beam rate signal having high frequency characteristics. The simulated beam rate signal and beam rate signal $E_3$ are applied to summation point 24 to provide an augmented beam rate signal $E_6$.

Limited beam displacement signal $E_2$ is applied to an integrator 28 which provides an integrator signal $E_7$ as an integral function of signal $E_2$ to minimize long term beam errors. Augmented beam rate signal $E_6$ and integrator signal $E_7$ are applied to a summation point 26 to provide a roll command signal $E_8$ which is limited by roll command limiter 32 to eliminate interference between the aircraft understructure and the runway at touchdown. The output of limiter 32 is applied to a command modifier 34, which limits roll rate commands, and the output of modifier 34 is combined at a summation point 36 with roll attitude signal $E_4$ from roll gyro 12 providing an aileron control signal $E_a$ which is applied to aileron control device 38, connected by suitable mechanical means 40 to ailerons 42.

The ouput of roll command limiter 32 is applied to a fixed gain variable limiter 46, which transmits this output at unity level during the approach maneuver. The output of variable limiter 46 is applied to an amplifier 48 providing a signal $E_9$ which is applied to a rudder control device 56 connected by suitable mechanical means 58 to a rudder 60. Signal $E_5$ from amplifier 21 is applied to a fixed gain variable limiter 50 which transmits heading displacement signal $E_5$ at zero level during the approach maneuver, thereby rendering heading displacement signal $E_5$ ineffective to control rudder 60 during the approach maneuver.

*Runway alignment maneuver*

At a predetermined time before touchdown, or at a predetermined altitude, a switching circuit 62 is operated to initiate the runway alignment maneuver and to provide a signal $E_{10}$ for actuating a solenoid 64 to move switch 66 from approach position to alignment position. Signal $E_{10}$ is applied to a lag circuit 63 to provide a bias signal $E_B$ connected to switch 66 and effective for controlling the signal transmission levels of variable limiter 46 and variable limiter 50. Variable limiter 46, which transmits the limited, roll command signal at the output of limiter 32 at unity level during the approach maneuver, as heretofore noted, reduces this level exponentially to zero during a predetermined period of time, in response to signal $E_B$, thereby rendering the limited roll command signal at the output of limiter 32 ineffective to control rudder 60 during the alignment maneuver after the predetermined period of time. Variable limiter 50, which transmits signal $E_5$ at zero level during the approch maneuver as heretofore noted, increases this level exponentially to unity during the predetermined period of time, in response to signal $E_B$, thereby rendering signal $E_5$ effective to control rudder 60 during the alignment maneuver after the predetermined period of time. The output of variable limiter 50 is applied to an integrator 54 to provide an integrator signal $E_{11}$ as an integral function of this output to minimize long term heading errors. Integrator signal $E_{11}$ is applied to rudder control device 56 to control rudder 60 during the alignment maneuver.

The predetermined period of time during which variable limiter 46 and variable limiter 50 operate, in response to signal $E_B$, is about 10 seconds, and is preselected to provide a smooth changeover from coordinated aileron and rudder control in response to signals $E_6$ and $E_7$ during the approach maneuver, to aileron control in response to signals $E_6$ and $E_7$, and rudder control in response to signal $E_{11}$ during the alignment maneuver. In other words, signal $E_{11}$ is substituted for signals $E_6$ and $E_7$ to control rudder 60 during the alignment maneuver.

*Operation*

During the runway approach maneuver ailerons 42 and rudder 60 are controlled in response to beam rate signal $E_3$, roll gyro signal $E_4$, heading displacement signal $E_5$ and integrator signal $E_7$. Roll gyro signal $E_4$ and heading displacement signal $E_5$ are combined to provide the short term high frequency simulated beam rate signal. The simulated beam rate signal is combined with beam rate signal $E_3$ to provide augmented beam rate signal $E_6$. Augmented beam rate signal $E_6$ and integrator signal $E_7$ are combined to provide roll command signal $E_8$ which is applied to the aileron control channel and combined will roll attitude signal $E_4$ providing aileron control signal $E_a$ for controlling ailerons 42, and applied as a crossfeed signal, through variable limiter 46, to the rudder control channel for providing signal $E_9$ to control rudder 56.

When the runway alignment maneuver is initiated, about a minute before touchdown, bias signal $E_B$ is provided for controlling variable limiter 46 and variable limiter 50. Variable limiter 46 is responsive to bias signal $E_B$ for gradually reducing the crossfeed signal, rendering the crossfeed signal ineffective to control rudder 60 during the alignment maneuver. Variable limiter 50, which blocks heading displacement signal $E_5$ from the rudder control channel during the approach maneuver, is responsive to bias signal $E_B$ for gradually increasing heading displacement signal $E_5$ during the alignment maneuver, and signal $E_5$ is applied to integrator 54 providing integrator signal $E_{11}$ for controlling rudder 60 during the alignment maneuver.

Variable limiter 46 and variable limiter 50 operate in response to bias signal $E_B$ simultaneously, thus reducing the crossfeed signal as heading displacement signal $E_5$ is increased. A smooth changeover from rudder control in response to the crossfeed signal during the approach maneuver to rudder control in response to heading displacement signal $E_5$ during the alignment maneuver is thus provided.

An important part of an aircraft landing system is the means for providing runway alignment control to insure safe touchdown of the aircraft. Such control provides that the landing gear of the aircraft is subjected to only reasonable side loads by minimizing the drift velocity of the landing gear due to crosswind conditions. The present invention provides novel means for implementing aircraft landing systems to provide this control.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A system for controlling an aircraft during runway approach and runway alignment maneuvers while landing the aircraft, comprising:

means for providing a first signal corresponding to the lateral displacement of the aircraft from the center line of the runway:

means for integrating the first signal to provide a second signal as an integral function of the lateral displacement;

means for providing a third signal as a differential function of the lateral displacement and corresponding to the rate of change thereof;

means for providing a fourth signal corresponding to the heading displacement of the aircraft from the center line of the runway;

means for integrating the fourth signal for providing a fifth signal as an integral function of the heading displacement;

means for providing a sixth signal corresponding to the roll angle of the aircraft;

rudder control means for controlling the aircraft rudder during the approach maneuver in response to the second, third, fourth, and sixth signals, and for controlling the aircraft rudder during the alignment maneuvers in response to the fifth signal, and;

aileron control means for controlling the aircraft ailerons during the approach and alignment maneuvers in response to the second, third, fourth and sixth signals.

2. A system as described in claim 1, including:

means for rendering the second, third, fourth and sixth signals ineffective for controlling the rudder during the alignment maneuver, and for rendering the fifth signal effective for controlling the rudder during the alignment maneuver.

3. A system as described in claim 2 wherein said means includes:

means for providing a bias signal when the alignment maneuver is initiated;

first means rendered operative during a predetermined period of time in response to the bias signal for rendering the second, third, fourth and sixth signals ineffective for controlling the rudder after the predetermined period of time, and;

second means rendered operative during the predetermined period of time in response to the bias signal for rendering the fifth signal effective for controlling the rudder after the predetermined period of time.

4. A system as described in claim 3, wherein:

the first means transmits the second, third, fourth and sixth signals at a level during the approach maneuver so that said signals are effective to control the rudder, with said first means veing responsive to the bias signal for exponentially decreasing said level during the predetermined period of time, and;

the second means transmits the fifth signal at a level during the approach maneuver so that said signal is ineffective to control the rudder, with the second means being responsive to the bias signal for exponentially increasing said level during the predetermined period of time.

5. A system as described in claim 1, including:

means connected to the foutrh signal means for providing a short term, high frequency signal in response to the fourth signal;

means connected to the sixth signal means for providing another short term, high frequency signal in response to the sixth signal;

means responsive to the short term high frequency signals for providing a signal simulating a short term rate of change of the lateral displacement of the aircraft from the center line of the runway;

means connected to the short term rate of change signal means and to the third signal means for augmenting the third signal in response to the short term rate of change signal;

the rudder control means being responsive to the augmented signal and the second signal to control the aircraft rudder during the approach maneuver, and;

the aileron control means being responsive to the augmented signal and the second signal to control the aircraft ailerons during the approach and alignment maneuvers.

6. A system as described in claim 5, including:

means connected to the augmented signal means and to the second signal means for providing a roll command signal;

means for limiting the roll command signal to prevent interference between the aircraft understructure and the runway at touchdown;

means for modifying the limited roll commaund signal so as to limit roll commands to the aileron control means, and;

means connected to said last mentioned means and to the sixth signal means for providing an aileron control signal in response to the limited, modified command signals and the sixth signals.

7. A system as described in claim 1, wherein:

the second signal means is connected to the first signal means for providing the second signal;

the third signal means is connected to the first signal means for providing the third signal, and;

the fifth signal means is connected to the fourth signal means for providing the fifth signal.

8. A system for controlling an aircraft during runway approach and runway alignment maneuvers while landing the aircraft, compirsing:

means for providing a signal as an integral function of lateral displacement of the aircraft from the center line of the runway;

means for providing a signal as a differential function of lateral displacement and corresponding to the rate of change thereof;

means for providing a signal corresponding to heading displacement of the aircraft from the center line of the runway;

means for providing a signal as an integral function of heading displacement;

means for providing a signal corresponding to roll angle of the aircraft;

rddder control means for controlling aircraft rudder during the approach maneuver in response to the lateral displacement integral signal, the lateral displacement differential signal, the heading displacement signal and the roll angle signal, and for controlling aircraft rudder during the alignment maneuver in response to the heading displacement integral signal; and aileron control means for controlling aircraft ailerons during the approach and alignment maneuvers in response to the lateral displacement integral signal, the lateral displacement differential signal, the heading displacement signal, and the roll angle signal.

References Cited

UNITED STATES PATENTS 3,223,362  12/1965  Doniger.
3,266,753  8/1966  Gaylor.

FERGUS S. MIDDLETON, *Primary Examiner.*

U.S. Cl. X.R.

343—108